(12) United States Patent
Nishi et al.

(10) Patent No.: US 9,787,956 B2
(45) Date of Patent: Oct. 10, 2017

(54) IMAGE PROJECTION APPARATUS

(71) Applicants: Yukimi Nishi, Tokyo (JP); Jun Mashimo, Tokyo (JP); Satoshi Tsuchiya, Kanagawa (JP); Tetsuya Fujioka, Kanagawa (JP); Yasunari Mikutsu, Tokyo (JP); Takahiro Hiramatsu, Kanagawa (JP); Hideo Kanai, Tokyo (JP); Akihisa Mikawa, Kanagawa (JP); Yoshito Saito, Kanagwa (JP)

(72) Inventors: Yukimi Nishi, Tokyo (JP); Jun Mashimo, Tokyo (JP); Satoshi Tsuchiya, Kanagawa (JP); Tetsuya Fujioka, Kanagawa (JP); Yasunari Mikutsu, Tokyo (JP); Takahiro Hiramatsu, Kanagawa (JP); Hideo Kanai, Tokyo (JP); Akihisa Mikawa, Kanagawa (JP); Yoshito Saito, Kanagwa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/214,771

(22) Filed: Jul. 20, 2016

(65) Prior Publication Data
US 2017/0026623 A1     Jan. 26, 2017

(30) Foreign Application Priority Data
Jul. 22, 2015 (JP) .................................. 2015-144919

(51) Int. Cl.
*H04N 9/31* (2006.01)
*H04N 5/74* (2006.01)

(52) U.S. Cl.
CPC ............ *H04N 9/315* (2013.01); *H04N 9/317* (2013.01); *H04N 9/3114* (2013.01); *H04N 9/3141* (2013.01); *H04N 9/3144* (2013.01)

(58) Field of Classification Search
CPC ..................................................... H04N 9/315
(Continued)

(56) References Cited

U.S. PATENT DOCUMENTS

| 7,639,933 B2 | 12/2009 | Seo et al. | |
|---|---|---|---|
| 2013/0162968 A1* | 6/2013 | De Groot | G03B 27/58 355/72 |
| 2015/0264291 A1* | 9/2015 | Tani | H04N 5/7475 348/748 |

FOREIGN PATENT DOCUMENTS

| JP | 2005-188555 | 7/2005 |
|---|---|---|
| JP | 2010-122485 | 6/2010 |
| JP | 2011-245085 | 12/2011 |

* cited by examiner

*Primary Examiner* — Michael Lee
*Assistant Examiner* — Justin Sanders
(74) *Attorney, Agent, or Firm* — IPUSA, PLLC

(57) ABSTRACT

An image projection apparatus includes an image generator configured to use light emitted from a light source to generate an image; a movable member in which the image generator is disposed, the movable member being movably supported; a fixed member being fixed and configured to movably support the movable member; and a mover configured to move the movable member. The mover includes a first pair of actuators facing each other in a first direction across the image generator, and a second pair of actuators facing each other in the second direction across the image generator. The first pair of actuators causes a driving force to operate on the movable member in a direction parallel to a second direction orthogonal to the first direction. The second pair of actuators causes a driving force to operate on (Continued)

the movable member in a direction parallel to the first direction.

11 Claims, 16 Drawing Sheets

(58) Field of Classification Search
USPC .......................................................... 348/789
See application file for complete search history.

IMAGE PROJECTION APPARATUS

CROSS-REFERENCE TO RELATED APPLICATION

The present application claims priority under 35 U.S.C. §119 to Japanese Patent Application No. 2015-144919, filed on Jul. 22, 2015. The contents of which are incorporated herein by reference in their entirety.

BACKGROUND OF THE INVENTION

1. Field of the Invention

The present invention relates to an image projection apparatus.

2. Description of the Related Art

An image projection apparatus is known in which an image generation unit generates an image based on image data received from a personal computer (PC) or a digital camera using light emitted by a light source, and the generated image is passed through an optical system including a plurality of lenses to project an image on a screen.

Various methods are proposed for adjusting the projection position, etc., of images in image projection apparatus described above. For example, there is known a position adjustment mechanism, which is externally attached to the image projection apparatus, for adjusting the height and the tilt, etc., of image projection positions (see, for example, Patent Document 1). Furthermore, there is known an image projection apparatus that uses an image rotating optical element to rotate a projection image around an optical axis (see, for example, Patent Document 2).

Patent Document 1: Japanese Unexamined Patent Application Publication No. 2005-188555

Patent Document 2: Japanese Unexamined Patent Application Publication No. 2010-122485

SUMMARY OF THE INVENTION

An aspect of the present invention provides image projection apparatus in which one or more of the above-described disadvantages are reduced.

According to one aspect of the present invention, there is provided an image projection apparatus including an image generator configured to use light emitted from a light source to generate an image; a movable member in which the image generator is disposed, the movable member being movably supported; a fixed member being fixed and configured to movably support the movable member; and a mover configured to move the movable member, the mover including a first pair of actuators disposed facing each other in a first direction across the image generator, the first pair of actuators being configured to cause a driving force to operate on the movable member in a direction parallel to a second direction orthogonal to the first direction; and a second pair of actuators disposed facing each other in the second direction across the image generator, the second pair of actuators being configured to cause a driving force to operate on the movable member in a direction parallel to the first direction.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A problem to be solved by an embodiment of the present invention is to provide an image projection apparatus that is capable of moving a projection image in a parallel direction and rotating a projection image, without requiring a large-sized device configuration.

A description will be given of embodiments with reference to the accompanying drawings.

Figure 1:
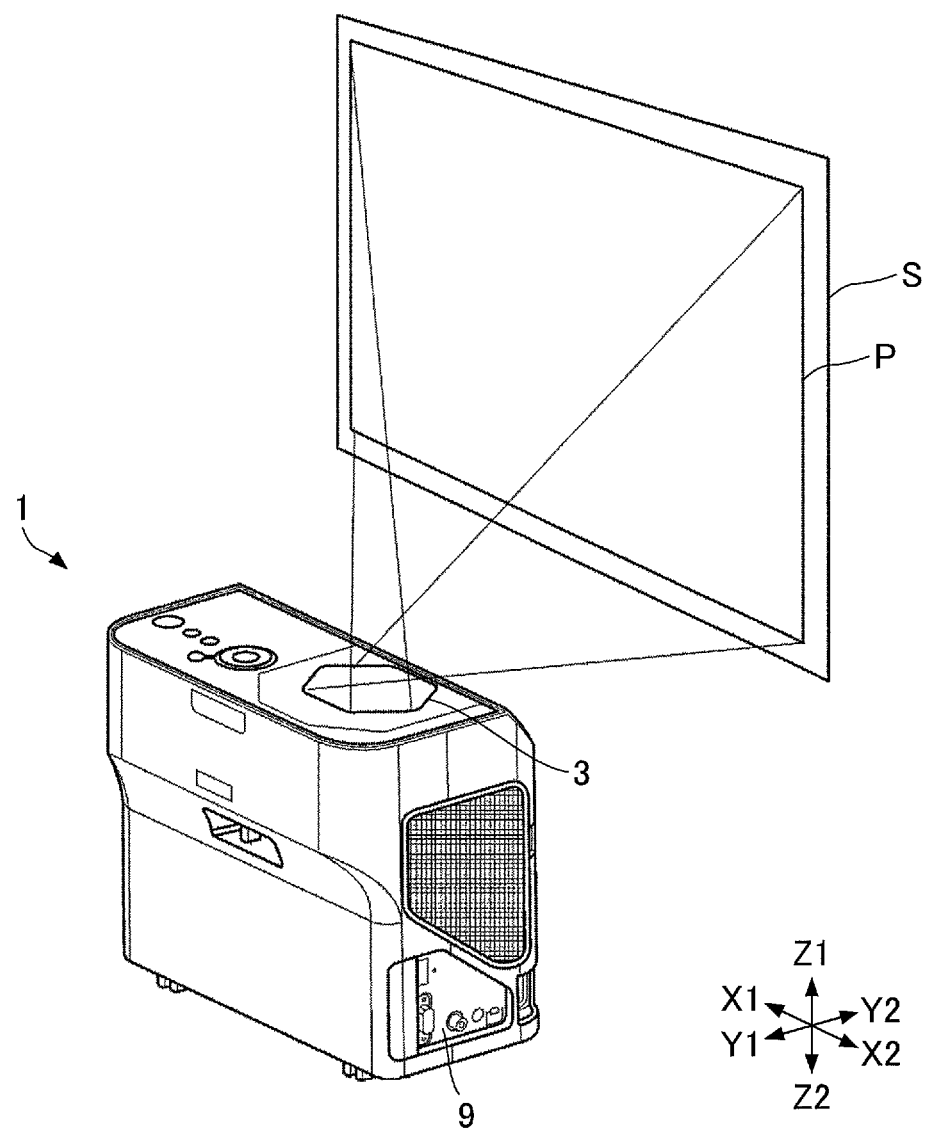
FIG. 1 is a diagram illustrating a projector which is an image projection apparatus according to an embodiment of the present invention.

FIG. 1 is a diagram illustrating a projector 1 which is an image projection apparatus according to an embodiment. As illustrated in FIG. 1, the projector 1 includes a radiation window 3 and an external interface (I/F) 9, and an optical engine which is configured to generate a projection image is provided in the inside of the projector 1. For example, when image data is transmitted to the projector 1 from a personal computer (PC) or a digital camera connected to the external interface 9, the optical engine generates an image based on the received image data and projects the image from the radiation window 3 onto a screen S as illustrated in FIG. 1.

Note that, in the following drawings, X1-X2 directions represent width directions of the projector 1, Y1-Y2 directions represent height directions of the projector 1, and Z1-Z2 directions represent depth directions of the projector 1. Moreover, in the following description, it is assumed that the radiation window 3 side of the projector 1 corresponds to the top of the projector 1 and the side of the projector 1 opposite to the radiation window 3 corresponds to the bottom of the projector 1.

Figure 2:
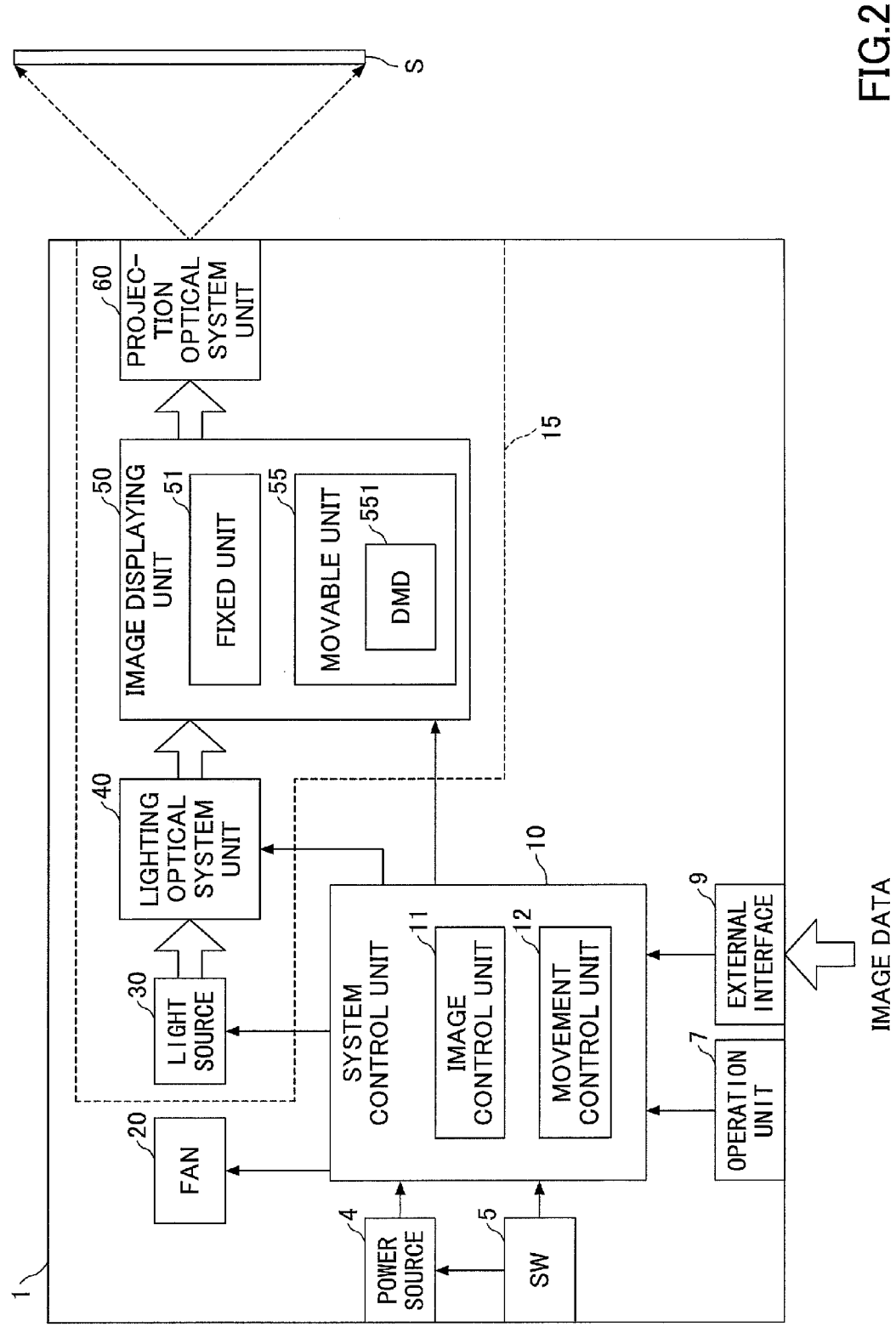
FIG. 2 is a block diagram illustrating a functional configuration of the projector according to an embodiment of the present invention.

FIG. 2 is a block diagram illustrating a functional configuration of the projector 1. As illustrated in FIG. 2, the projector 1 includes a power source 4, a main switch (SW) 5, an operation unit 7, an external interface (I/F) 9, a system control unit 10, a fan 20, and an optical engine 15.

The power source 4 is connected to a commercial power source, converts voltage and frequency of the commercial power for the internal circuits of the projector 1, and supplies the resulting power to each of the system control unit 10, the fan 20, and the optical engine 15.

The main switch 5 is switched ON or OFF by a user to power on or off the projector 1. While the power source 4 is connected to the commercial power source via a power cord, if the main switch 5 is switched ON, the power source 4 starts supplying power to the respective components of the projector 1, and if the main switch 5 is switched OFF, the power source 4 stops the power supply to the respective components of the projector 1.

The operation unit 7 includes buttons configured to receive various input operations by a user. For example, the operation unit 7 is provided on a top surface of the projector 1. The operation unit 7 is configured to receive input operations by the user, such as selection of a size of a projection image, selection of a color tone, and adjustment of a focus. The user's input operation received by the operation unit 7 is sent to the system control unit 10.

The external interface 9 includes connection terminals connected to, for example, a personal computer (PC) or a digital camera, and is configured to supply image data, which is received from the connected apparatus, to the system control unit 10.

The system control unit 10 includes an image control unit 11 and a movement control unit 12. For example, the system control unit 10 may include a CPU (a processor), a ROM, and a RAM as hardware components thereof. The functions of the system control unit 10 may be implemented by instructions from the CPU when a program read from the ROM into the RAM is executed by the CPU.

The image control unit 11 is configured to control a digital micromirror device (DMD) 551 provided in an image displaying unit 50 of the optical engine 15 based on the image data received from the external interface 9, to generate an image to be projected on the screen S.

The movement control unit 12 is configured to move a movable unit 55 (which is provided to be movable in the image displaying unit 50) and control a position of the DMD 551 provided in the movable unit 55. The movable unit 55 is an example of a movable member.

The fan 20 is rotated under the control of the system control unit 10 to cool a light source 30 of the optical engine 15. The optical engine 15 includes the light source 30, a lighting optical system unit 40, the image displaying unit 50, and a projection optical system unit 60. The optical engine 15 is controlled by the system control unit 10 to project an image on a screen S as illustrated in FIG. 1.

Examples of the light source 30 include a mercury high-pressure lamp, a xenon lamp, and a light emitting diode (LED). The light source 30 is controlled by the system control unit 10 to emit light to the lighting optical system unit 40.

The lighting optical system unit 40 includes, for example, a color wheel, a light tunnel, and relay lenses. The lighting optical system unit 40 is configured to guide the light emitted from the light source 30 to the DMD 551 provided in the image displaying unit 50.

The image displaying unit 50 includes a fixed unit 51 which is fixed and supported on the image displaying unit 50, and the movable unit 55 which is provided to be movable relative to the fixed unit 51. The fixed unit 51 is an example of a fixed member. The movable unit 55 includes the DMD 551 and a position of the movable unit 55 relative to the fixed unit 51 is controlled by the movement control unit 12 of the system control unit 10. The DMD 551 is an example of an image generator. The DMD 551 is controlled by the image control unit 11 of the system control unit 10. The DMD 551 is configured to modulate the light received from the lighting optical system unit 40 and generate a projection image based on the received light.

The projection optical system unit 60 includes, for example, a plurality of projection lenses and a mirror. The projection optical system unit 60 is configured to enlarge the image generated by the DMD 551 of the image displaying unit 50, and project the enlarged image on the screen S.

Next, a configuration of the optical engine 15 of the projector 1 is explained.

Figure 3:
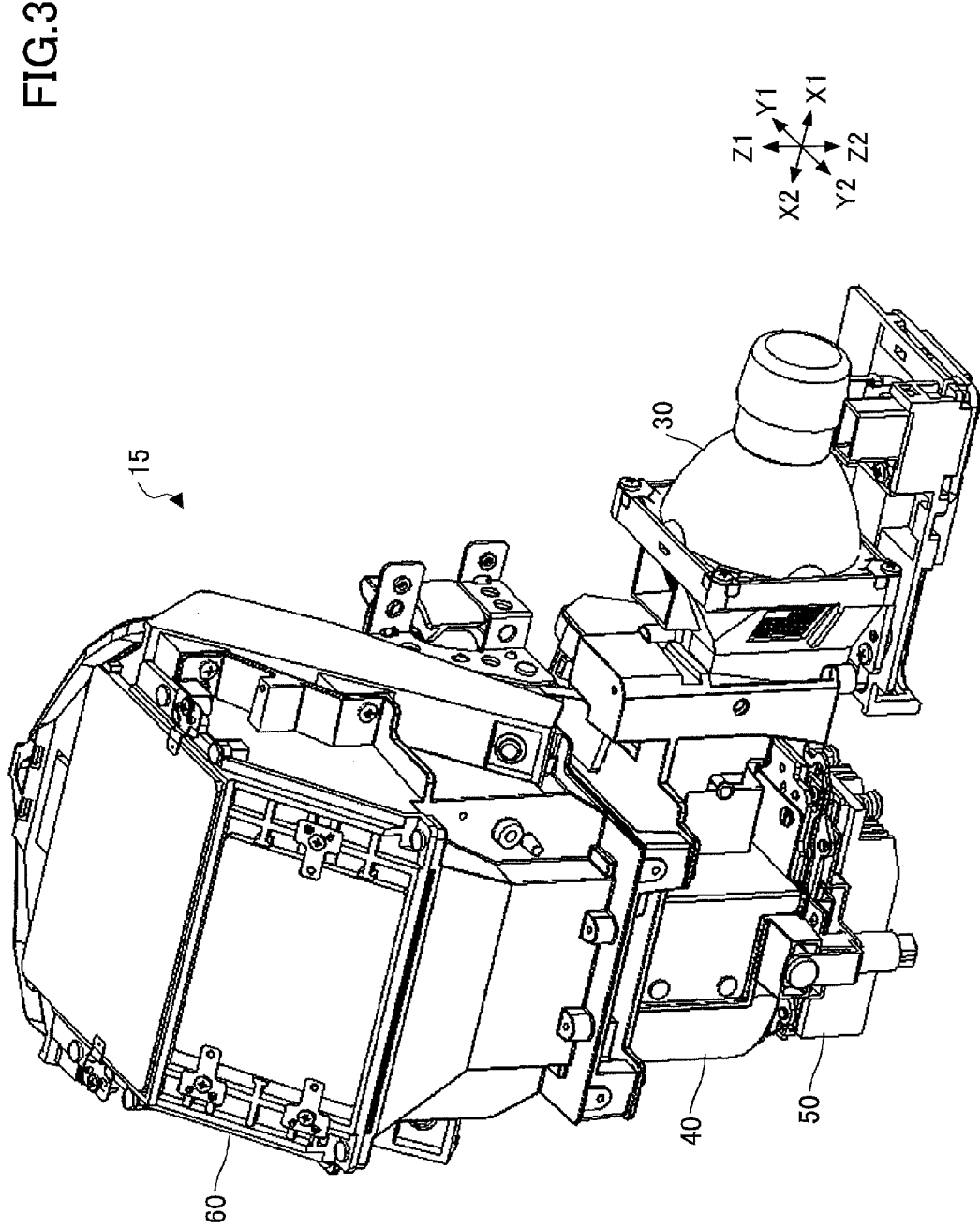
FIG. 3 is a perspective view of an optical engine of the projector according to an embodiment of the present invention.

FIG. 3 is a perspective view of the optical engine 15 of the projector 1. As illustrated in FIG. 3, the optical engine 15 includes the light source 30, the lighting optical system unit 40, the image displaying unit 50, and the projection optical system unit 60. The optical engine 15 is provided in the inside of the projector 1.

The light source 30 is provided on a side surface of the lighting optical system unit 40. The light source 30 is configured to emit light in the X2 direction. The lighting optical system unit 40 is configured to guide the light emitted from the light source 30 to the image displaying unit 50. The image displaying unit 50 is provided beneath the lighting optical system unit 40. The image displaying unit 50 is configured to generate a projection image based on the light received from the lighting optical system unit 40. The projection optical system unit 60 is provided above the lighting optical system unit 40. The projection optical system unit 60 is configured to project the projection image generated by the image displaying unit 50 onto the screen S which is provided outside the projector 1.

The optical engine 15 of this embodiment is configured to project the image based on the light emitted from the light source 30 in an upward direction. Alternatively, the optical engine 15 may be configured to project the image in a horizontal direction.

Figure 4:
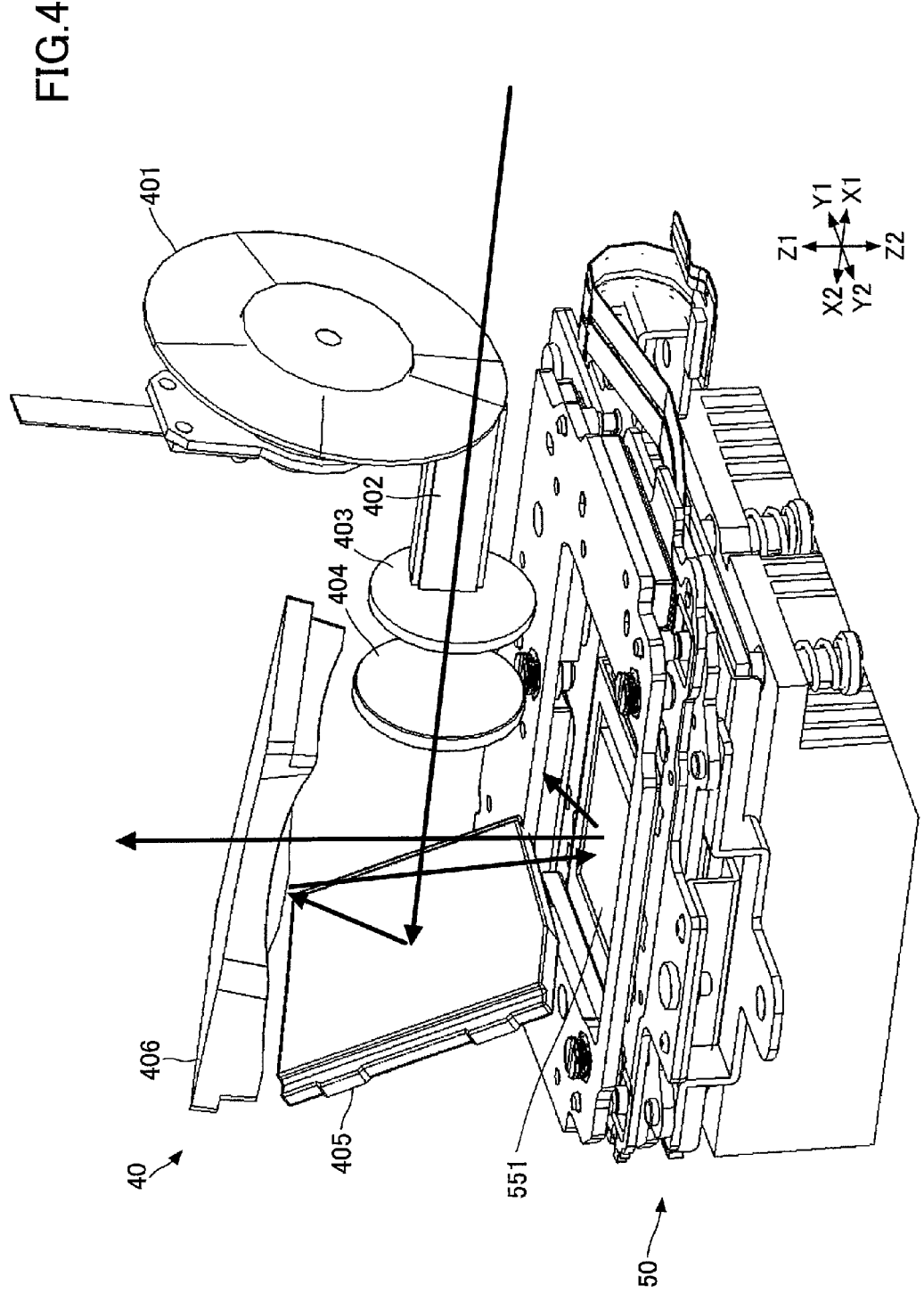
FIG. 4 is a diagram illustrating a lighting optical system unit according to an embodiment of the present invention.

FIG. 4 is a diagram illustrating the lighting optical system unit 40. As illustrated in FIG. 4, the lighting optical system unit 40 includes a color wheel 401, a light tunnel 402, relay lenses 403 and 404, a cylinder mirror 405, and a concave mirror 406.

The color wheel 401 is, for example, a disc-like component in which color filters of R (red), G (green), and B (blue) are provided at different portions in a circumferential direction thereof. The color wheel 401 is rotated at high speed so that the light emitted from the light source 30 is divided into RGB color light beams in a time-division manner.

The light tunnel 402 is, for example, a rectangular tube-like component formed of bonded glass sheets. The light tunnel 402 functions to perform multipath reflection of the RGB color light beams passing through the color wheel 401 by the internal surfaces thereof for equalization of luminance distribution, and guides the resulting light beams to the relay lenses 403 and 404.

The relay lenses 403 and 404 function to correct the chromatic aberrations on the optical axis of the light beams emitted from the light tunnel 402 and convert the light beams into converging light beams.

The cylinder mirror 405 and the concave mirror 406 function to reflect the light emitted from the relay lens 404 to the DMD 551 provided in the image displaying unit 50. The DMD 551 is configured to modulate the light reflected from the concave mirror 406 and generate a projection image.

Figure 5:
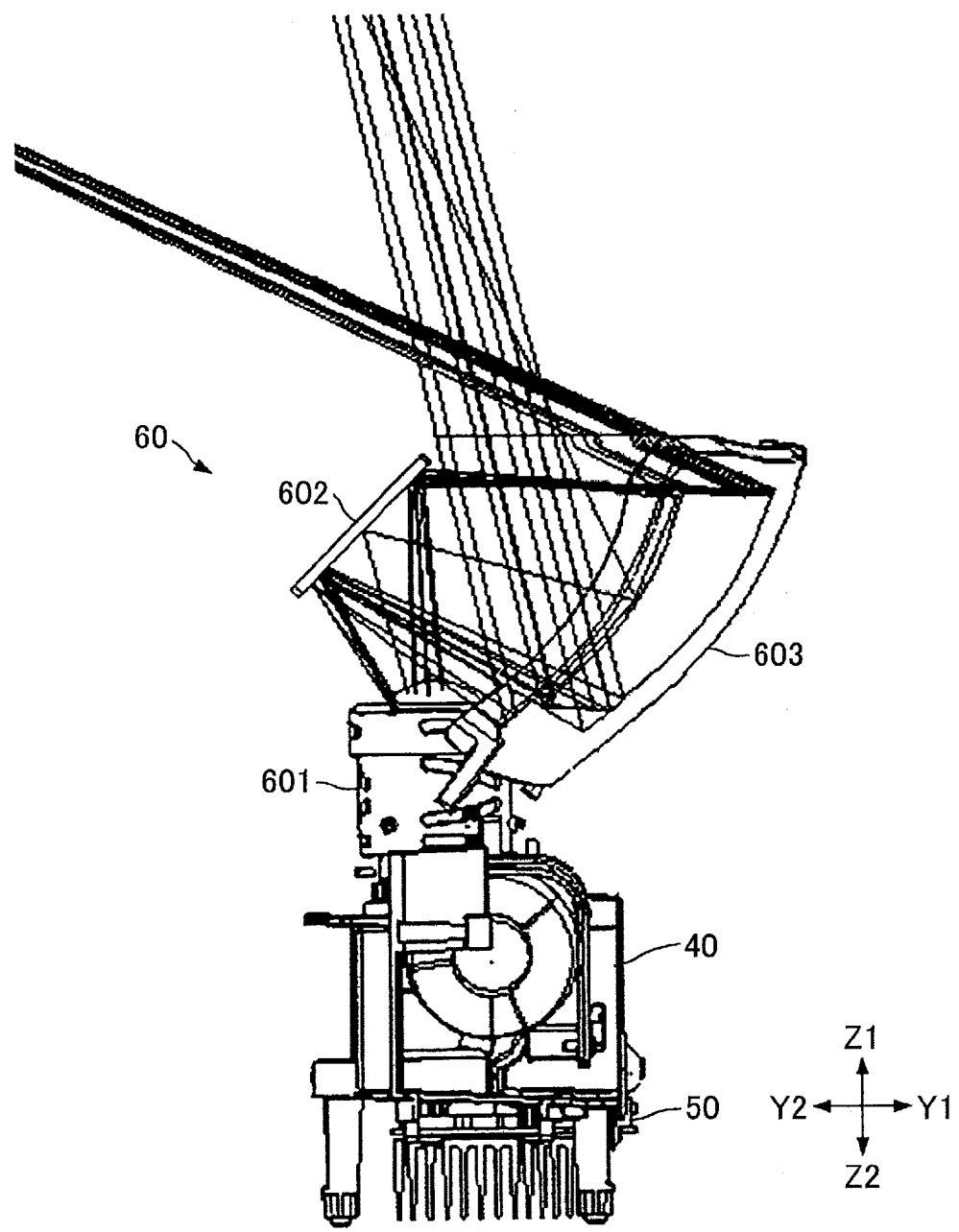
FIG. 5 is a diagram illustrating an internal configuration of a projection optical system unit according to an embodiment of the present invention.

FIG. 5 is a diagram illustrating an internal configuration of the projection optical system unit 60. As illustrated in FIG. 5, the projection optical system unit 60 includes projection lenses 601, a folding mirror 602, and a curved surface mirror 603 which are provided in a housing of the projection optical system unit 60.

The projection lenses 601 include a plurality of lenses. The projection lenses 601 function to focus the projection image generated by the DMD 551 of the image displaying unit 50 onto the folding mirror 602. The folding mirror 602 and the curved surface mirror 603 function to reflect the focused projection image so as to be enlarged, and project the resulting image on the screen S which is provided outside the projector 1.

Figure 6:
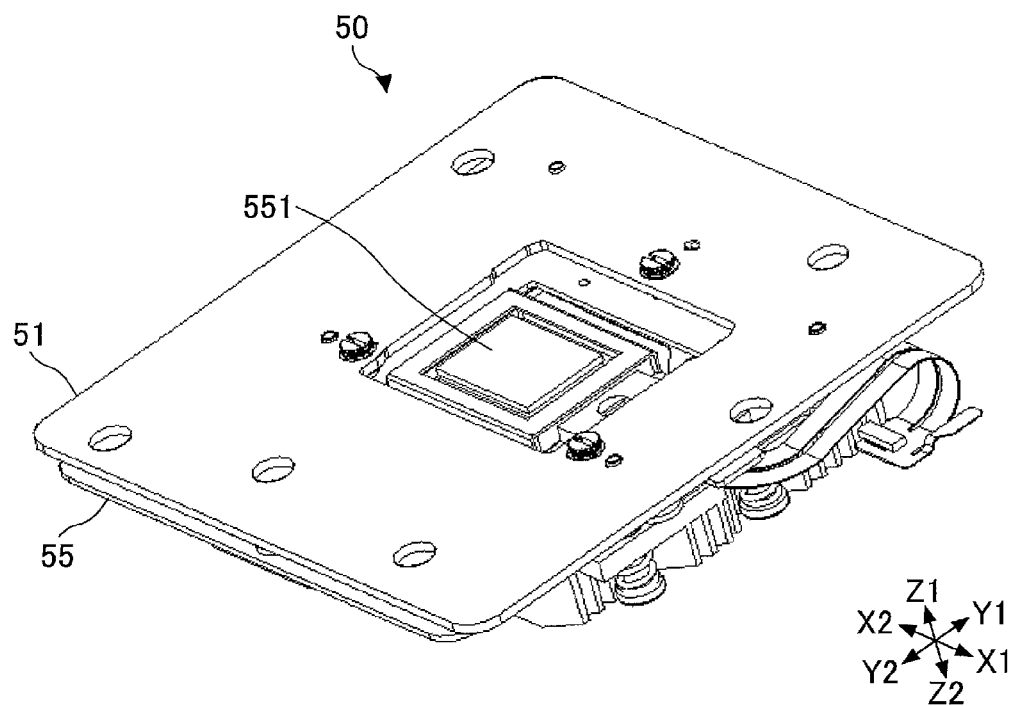
FIG. 6 is a perspective view of an image displaying unit according to an embodiment of the present invention.
Figure 7:
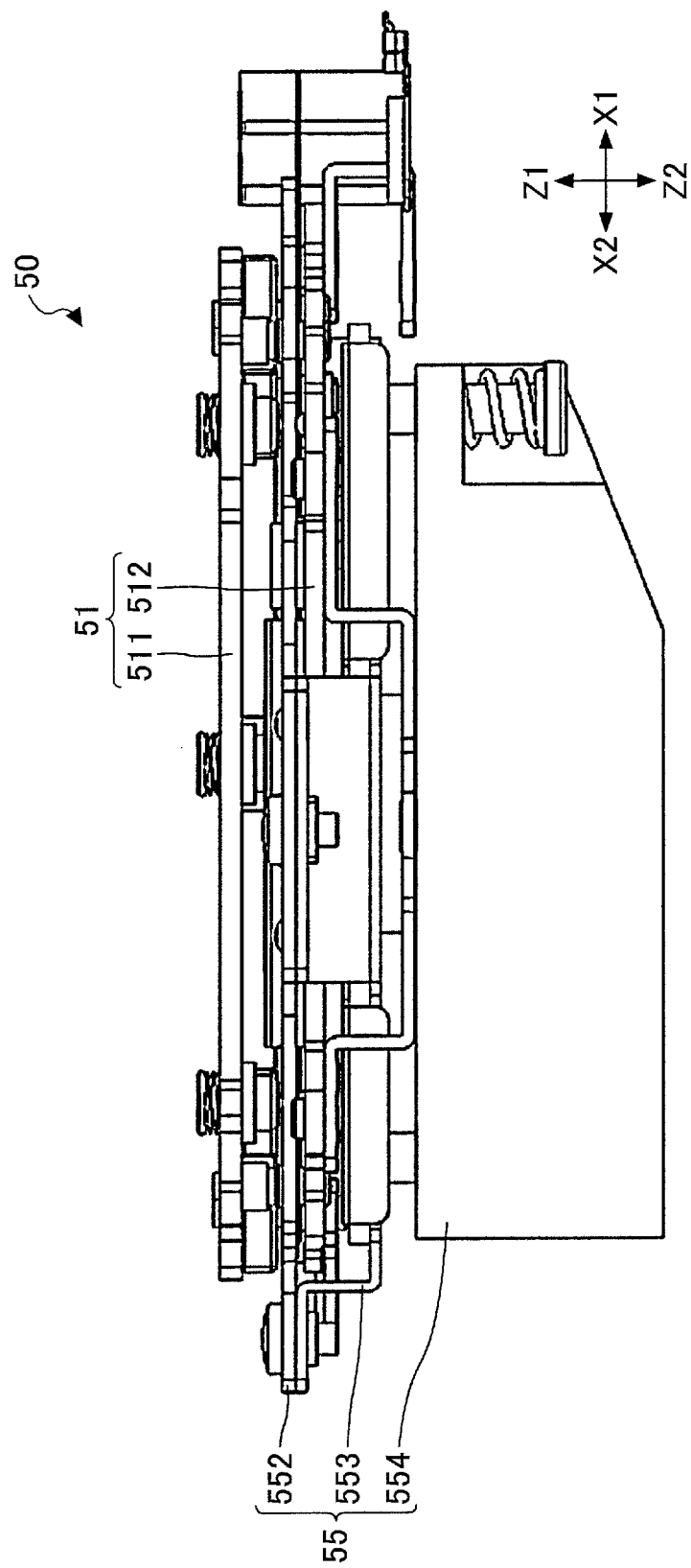
FIG. 7 is a side view of the image displaying unit according to an embodiment of the present invention.

FIG. 6 is a perspective view of the image displaying unit 50. FIG. 7 is a side view of the image displaying unit 50.

As illustrated in FIG. 6 and FIG. 7, the image displaying unit 50 includes the fixed unit 51 which is fixed and supported, and the movable unit 55 which is provided to be movable to the fixed unit 51.

The fixed unit 51 includes a top plate 511 as a first fixed member, and a base plate 512 as a second fixed member. In the fixed unit 51, the top plate 511 and the base plate 512 are held in parallel and face each other via a predetermined gap between them. The fixed unit 51 is fixed to the bottom of the lighting optical system unit 40.

The movable unit 55 includes the DMD 551, a movable plate 552 as a first movable member, a joint plate 553 as a second movable member, and a heat sink 554. The movable unit 55 is supported to be movable relative to the fixed unit 51 by the fixed unit 51.

The movable plate 552 is provided between the top plate 511 and the base plate 512 of the fixed unit 51. The movable plate 552 is supported by the fixed unit 51 to be movable in a direction which is parallel to the top plate 511 and the base plate 512 and parallel to the surface of the movable plate 552.

The joint plate 553 is fixed to the movable plate 552 with the base plate 512 of the fixed unit 51 being inserted between the movable plate 552 and the joint plate 553. The DMD 551 is fixed to a top surface of the joint plate 553, and the heat sink 554 is fixed to a bottom surface of the joint plate 553. The joint plate 553, which is fixed to the movable plate 552, is supported by the fixed unit 51 to be movable relative to the fixed unit 51 integrally with the movable plate 552, the DMD 551, and the heat sink 554.

The DMD 551 is mounted on a surface of the joint plate 553 on the movable plate 552 side. The DMD 551 is provided to be movable integrally with the movable plate 552 and the joint plate 553. The DMD 551 includes an image generation surface on which a plurality of rotatable micromirrors are arrayed in a lattice formation. A specular surface of each of the micromirrors of the DMD 551 is provided to be slantingly rotatable around a twist shaft. The ON/OFF drive of the micromirrors of the DMD 551 is performed based on an image signal transmitted from the image control unit 11 of the system control unit 10.

For example, in an ON state, an inclination angle of a micromirror is controlled so that the micromirror reflects the light from the light source 30 to the projection optical system unit 60, and in an OFF state, the inclination angle of the micromirror is controlled so that the micromirror reflects the light from the light source 30 to an OFF light plate (which is not illustrated).

In this manner, the inclination angle of each of the micromirrors of the DMD 551 is controlled based on the image signal transmitted from the image control unit 11, and the light emitted from the light source 30 and passing through the lighting optical system unit 40 is modulated and a projection image is generated by the DMD 551.

The heat sink 554 is an example of a heat dissipation unit. The heat sink 554 is provided so that the heat sink 554 at least partially contacts the DMD 551. Integrally with the DMD 551, the heat sink 554 is mounted on the joint plate 553 which is supported to be movable, and it is possible to efficiently cool the DMD 551 by the contact of the heat sink 554 with the DMD 551. By this configuration of the heat sink 554, the projector 1 is capable of preventing the temperature of the DMD 551 from increasing and capable of reducing problems, such as malfunction and failure, due to the temperature rise of the DMD 551.

Figure 8:
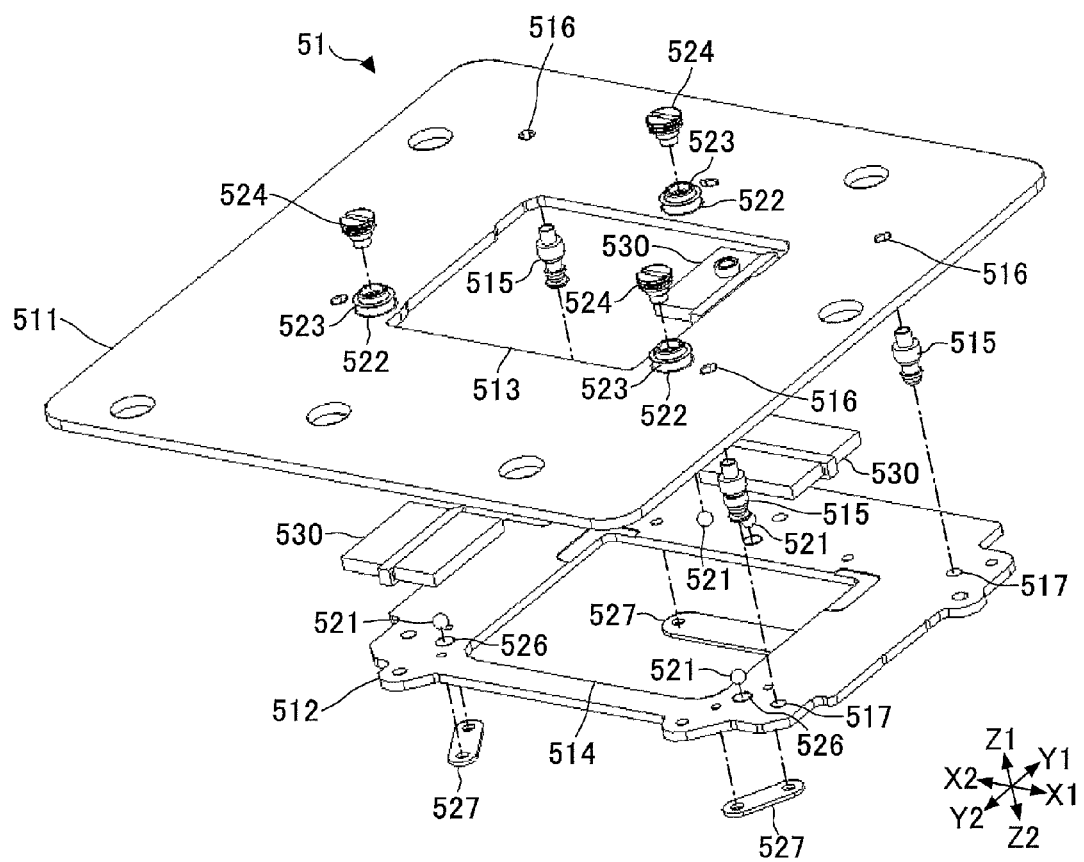
FIG. 8 is a perspective view of a fixed unit according to an embodiment of the present invention.

FIG. 8 is an exploded perspective view of the fixed unit 51 according to an embodiment.

As illustrated in FIG. 8, the fixed unit 51 includes the top plate 511 and the base plate 512.

The top plate 511 and the base plate 512 are made of a flat-shaped plate material. The top plate 511 has a central hole 513 formed in a position corresponding to the DMD 551 of the movable unit 55. The base plate 512 has a central hole 514 formed in a position corresponding to the DMD 551 of the movable unit 55. The top plate 511 and the base plate 512 are supported by plural supports 515 so that the top plate 511 and the base plate 512 are held in parallel and face each other via the predetermined gap between them.

As illustrated in FIG. 8, an upper end portion of each of the supports 515 is press fitted in a corresponding one of support holes 516 which are formed in the top plate 511, and a lower end portion of the support 515 is inserted in a corresponding one of support holes 517 which are formed in the base plate 512. The lower end portion of each of the supports 515 is formed with an external thread groove. The supports 515 support the top plate 511 and the base plate 512 so that the top plate 511 and the base plate 512 are held in parallel and face each other via the predetermined gap between them.

Moreover, support holes 522 are formed in the top plate 511 to hold support balls 521 rotatably, and support holes 526 are formed in the base plate 512 to hold support balls 521 rotatably.

Cylindrical holding members 523 each of which has an internal thread groove formed in an inner peripheral surface of the holding member 523 are inserted in the support holes 522 of the top plate 511. The holding members 523 hold the support balls 521 rotatably, respectively. Positioning screws 524 are inserted into upper end portions of the holding members 523, respectively. Lower end faces of the support holes 526 of the base plate 512 are closed by lid members 527 and 528, and the support holes 526 of the base plate 512 hold the support balls 521 rotatably.

The support balls 521 which are rotatably held by the support holes 522 and 526 of the top plate 511 and the base plate 512 are respectively in contact with the movable plate 552 provided between the top plate 511 and the base plate 512. Hence, the support balls 521 movably support the movable plate 552.

Figure 9:
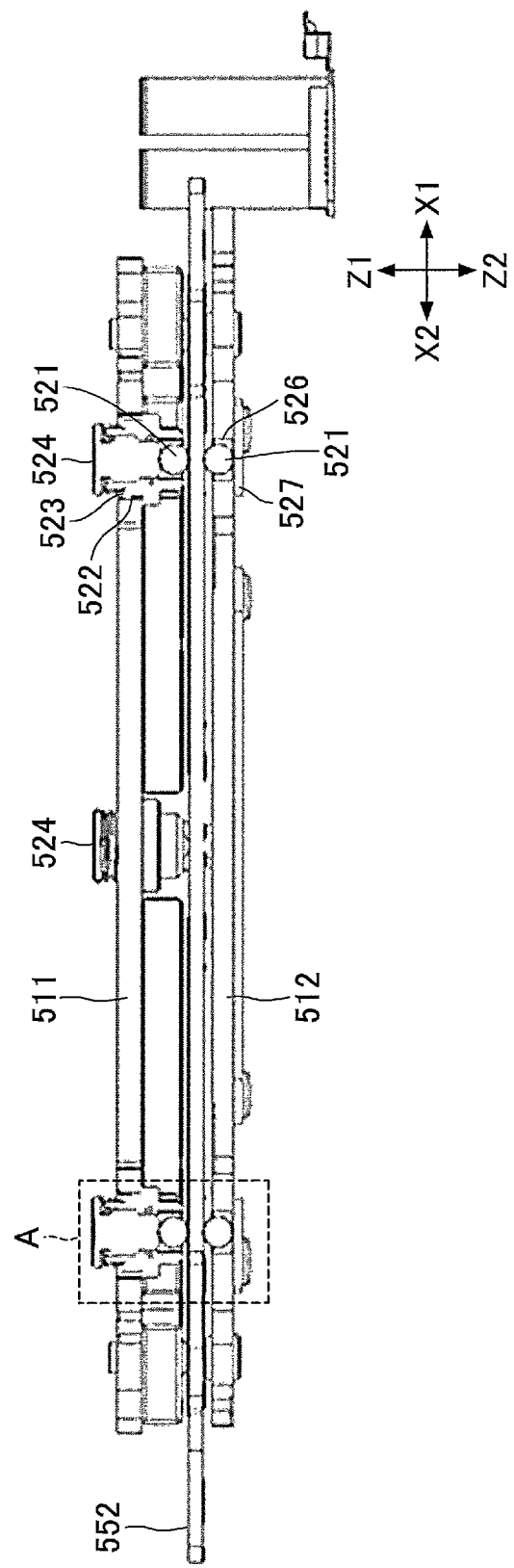
FIG. 9 is an exploded perspective view of the fixed unit according to an embodiment of the present invention.
Figure 10:
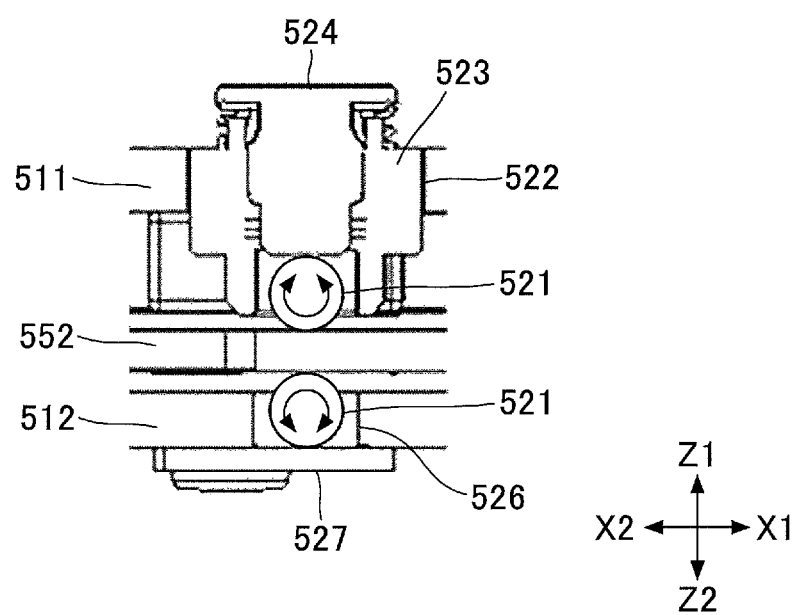
FIG. 10 is a diagram illustrating a support structure of a movable plate held by the fixed unit.

FIG. 9 is a diagram illustrating a support structure of the movable plate 552 by the fixed unit 51. FIG. 10 is an enlarged diagram illustrating a portion (indicated by the letter "A" in FIG. 9) of the support structure of the movable plate 552 by the fixed unit 51.

As illustrated in FIG. 9 and FIG. 10, in the top plate 511, the support balls 521 are rotatably held by the holding members 523 which are inserted in the support holes 522. In the base plate 512, the support balls 521 are rotatably held by the support holes 526 the lower end faces of which are closed by the lid members 527 and 528.

Each of the support balls 521 is held so that the support ball 521 projects at least partially from the support hole 522 or the support hole 526. Each of the support balls 521 contacts the movable plate 552 provided between the top plate 511 and the base plate 512 to support the movable plate 552. The top surface and the bottom surface of the movable plate 552 are supported by the rotatably held support balls 521 so that the movable plate 552 is movable in the direction which is parallel to the top plate 511 and the base plate 512 and parallel to the top and bottom surfaces of the movable plate 552.

Moreover, the amount of projection of the support ball 521 (provided on the top plate 511 side) from the lower end of the holding member 523 is varied depending on a position of the positioning screw 524 (which contacts the support ball 521 on the side opposite to the movable plate 552). For example, if the positioning screw 524 is displaced in the Z1 direction (upward), the amount of projection of the support ball 521 is decreased and the gap between the top plate 511 and the movable plate 552 is decreased. On the other hand, if the positioning screw 524 is displaced in the Z2 direction (downward), the amount of projection of the support ball 521 is increased and the gap between the top plate 511 and the movable plate 552 is increased.

Hence, the gap between the top plate 511 and the movable plate 552 may be appropriately adjusted by changing the amount of projection of the support ball 521 using the positioning screw 524.

Moreover, as illustrated in FIG. 8, a plurality of magnets 530 are mounted on a bottom surface of the top plate 511 on the base plate 512 side. The magnets 530 are provided at four locations which surround the central hole 513 of the top plate 511. Each of the magnets 530 is made of a pair of magnet pieces having a rectangular parallelepiped shape. The two magnet pieces of each pair are arranged side by side so that longitudinal directions of the two magnet pieces are parallel to each other. Each of the magnets 530 forms a magnetic field which functions to attract the movable plate 552.

Coils are provided on the top surface of the movable plate 552. The magnets 530 on the top plate 511 and the corresponding coils on the movable plate 552 constitute a movement device configured to move the movable plate 552.

Note that the number and positions of the supports 515 and the support balls 521 which are provided on the fixed unit 51 are not limited to the configuration of this embodiment, and it is sufficient that the supports 515 and the support balls 521 are provided to support the movable plate 552 movably.

Figure 11:
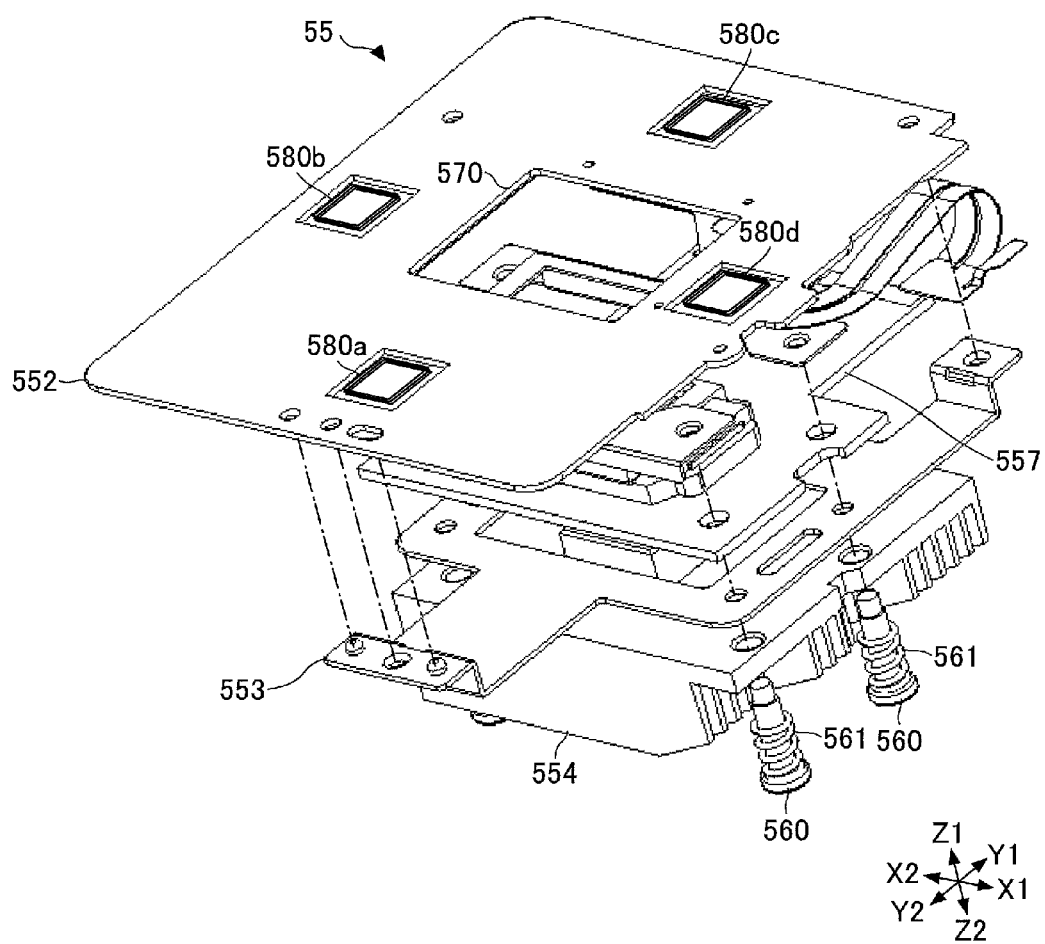
FIG. 11 is an exploded perspective view of a movable unit according to an embodiment of the present invention.

FIG. 11 is an exploded perspective view of the movable unit 55 according to an embodiment.

As illustrated in FIG. 11, the movable unit 55 includes the movable plate 552, the joint plate 553, the heat sink 554, and a DMD base 557. The movable unit 55 is supported to be movable relative to the fixed unit 51.

As described above, the movable plate 552 is provided between the top plate 511 and the base plate 512 of the fixed unit 51 and supported by the support balls 521 to be movable in the direction parallel to the top and bottom surfaces of the movable plate 552.

As illustrated in FIG. 11, the movable plate 552 is made of a flat-shaped plate material. The movable plate 552 has a central hole 570 in the position corresponding to the DMD 551 which is mounted on the DMD base 557, and coils 580a through 580d are formed at four positions on the periphery of the central hole 570. Note that in the following descriptions, the coils 580a through 580d may be simply referred to as coils 580.

Each of the coils 580 is formed of electric wires wound around a shaft parallel to the Z1-Z2 directions. The coils 580 are provided in recesses formed in the bottom surface of the top plate 511 on the movable plate 552 side. The coils 580 on the movable plate 552 and the magnets 530 on the top plate 511 constitute the movement device configured to move the movable plate 552.

In the state in which the movable unit 55 is supported by the fixed unit 51, the magnets 530 on the top plate 511 and the coils 580 on the movable plate 552 are provided to face each other, respectively. When electric current flows through the coils 580, Lorentz forces as driving forces to move the movable plate 552 are generated by the magnetic fields formed by the coils 580 and the magnets 530. The movable plate 552 is linearly moved or rotated to the fixed unit 51 within an XY plane by the Lorentz forces as the driving forces which are generated by the magnets 530 and the coils 580.

The magnitude and direction of the current flowing through each of the coils 580 are controlled by the movement control unit 12 of the system control unit 10. The movement control unit 12 controls the direction of movement (or rotation), the amount of movement and the rotational angle of the movable plate 552 by changing the magnitude and direction of the current flowing through each of the coils 580.

As illustrated in FIG. 11, the joint plate 553 is fixed to the bottom surface of the movable plate 552 (on the base plate 512 side), and the movable plate 552 is movably supported by the fixed unit 51. The joint plate 553 is made of a flat-shaped plate material. The joint plate 553 has a central hole in the position corresponding to the DMD 551. Folded portions provided on the periphery of the joint plate 553 are fixed to the bottom surface of the movable plate 552 by screws, etc.

The DMD 551 is mounted on the top surface of the joint plate 553 and the heat sink 554 is mounted on the bottom surface of the joint plate 553. The joint plate 553, which is fixed to the movable plate 552, is provided to be movable relative to the fixed unit 51 according to the movement of the movable plate 552 integrally with the DMD 551 and the heat sink 554.

The DMD 551 is mounted on the DMD base 557, and the DMD 551 is fixed to the joint plate 553 together with the DMD base 557. As illustrated in FIG. 11, the DMD base 557, the joint plate 553, and the heat sink 554 are laminated and fixed by shoulder screws 560 (which are fastener members) and springs 561 (which are pressure units).

Figure 12:
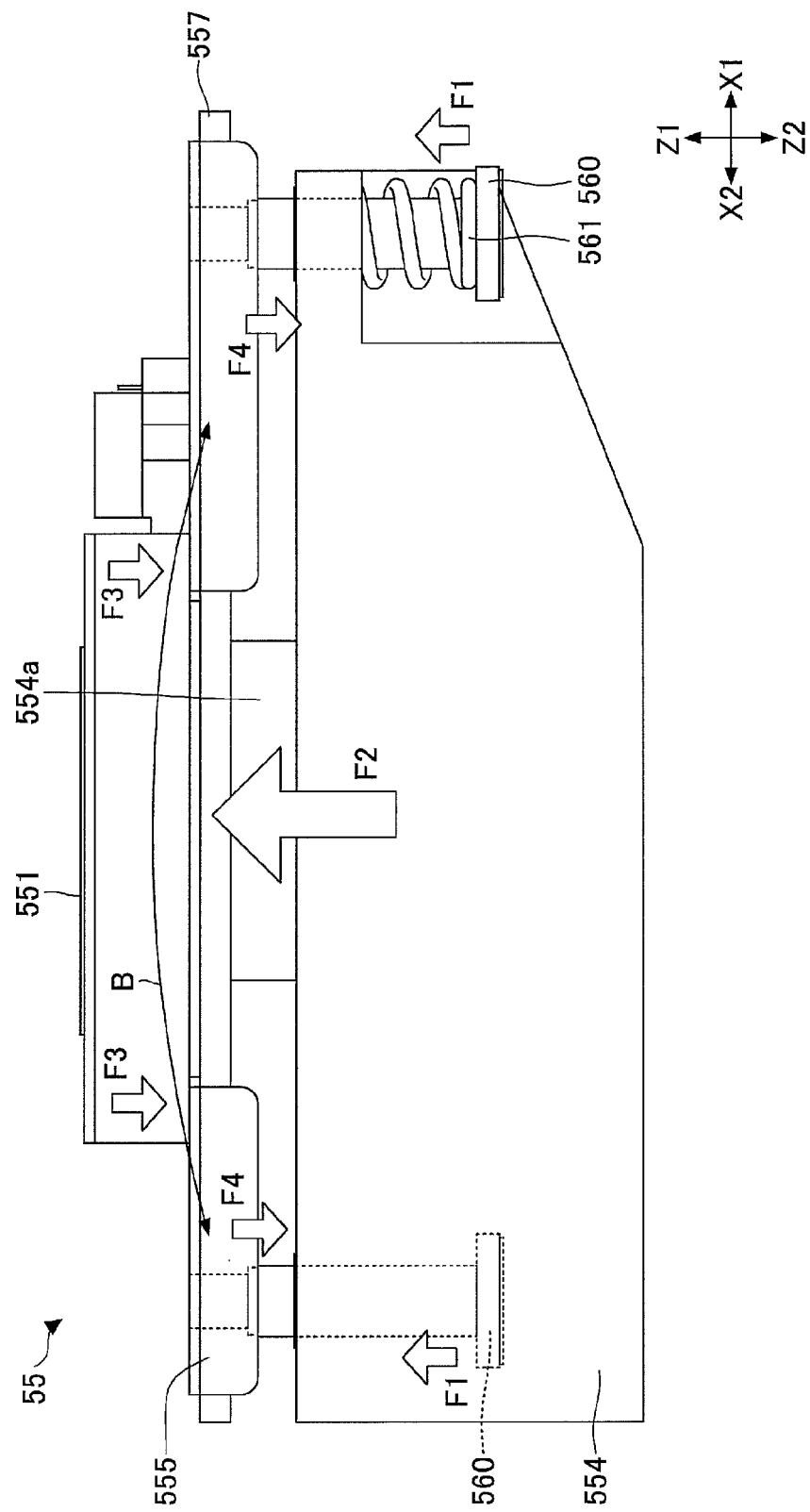
FIG. 12 is a diagram illustrating a DMD holding structure of the movable unit according to an embodiment of the present invention.

FIG. 12 is a diagram illustrating a DMD holding structure of the movable unit 55. FIG. 12 is a side view of the movable unit 55, and in FIG. 12, the illustration of the movable plate 552 and the joint plate 553 is omitted.

As illustrated in FIG. 12, the heat sink 554 includes a projection 554a which contacts the bottom surface of the DMD 551 via a through hole formed in the DMD base 557 when the heat sink 554 is fixed to the joint plate 553. Note that, alternatively, the projection 554a of the heat sink 554 may be a projection provided on the bottom surface of the DMD base 557 to contact the position of the heat sink 554 corresponding to the DMD 551.

In order to increase the effect of cooling the DMD 551 by the heat sink 554, a heat transfer sheet that is elastically deformable may be interposed between the projection 554a of the heat sink 554 and the DMD 551. In such a case, the thermal conductivity between the projection 554a of the heat sink 554 and the DMD 551 will be increased by the heat transfer sheet, and thereby the effect of cooling the DMD 551 by the heat sink 554 will be increased.

As described above, the holding member 555, the DMD base 557, and the heat sink 554 are laminated and fixed by the shoulder screws 560 and the springs 561. If the shoulder screws 560 are tightened, the springs 561 are compressed in the Z1-Z2 directions, and a force F1 in the Z1 direction (as indicated in FIG. 12) is produced by the spring 561. The heat sink 554 is pressed onto the DMD 551 by a force F2 in the Z1 direction which is the resultant of the forces F1 produced by the springs 561.

In this embodiment, the shoulder screws 560 and the springs 561 are provided at four locations, and the force F2 acting on the heat sink 554 becomes equal to the resultant of the forces F1 produced by the four springs 561. The force F2 from the heat sink 554 is exerted on the holding member 555 which holds the DMD base 557 on which the DMD 551 is mounted. As a result, a reaction force F3 in the Z2 direction equivalent to the force F2 from the heat sink 554 is exerted on the holding member 555, so that the DMD base 557 can be held between the holding member 555 and the joint plate 553.

A force F4 in the Z2 direction acts on the shoulder screws 560 and the springs 561 due to the force F3 acting on the holding member 555. Because the springs 561 are provided at four locations, the force F4 acting on each of the springs is equivalent to one fourth (¼) of the force F3 acting on the holding member 555, and the force F4 and the force F1 are in equilibrium.

The holding member 555 is formed like a leaf spring and made of a material which can be bent as indicated by the arrow B in FIG. 12. The holding member 555 is bent by the upward force from the projection 554a of the heat sink 554, the downward force to push back the heat sink 554 in the Z2 direction is produced by the holding member 555, and firm contact between the DMD 551 and the heat sink 554 can be maintained.

As described above, in the movable unit 55, the movable plate 552 and the joint plate 553 (on which the DMD 551 and the heat sink 554 are mounted) are movably supported by the fixed unit 51. The position of the movable unit 55 is controlled by the movement control unit 12 of the system control unit 10. Moreover, the heat sink 554 contacting the DMD 551 by pressure is mounted on the movable unit 55, and the projector 1 is capable of having reduced problems, such as malfunction and failure, due to the temperature rise of the DMD 551.

Next, a description is given of operations of the image displaying unit 50. The movable unit 55 of the image displaying unit 50 is movably supported by the fixed unit 51. The movable unit 55 receives Lorentz forces generated between the magnets 530 provided in the top plate 511 and the coils 580 provided in the movable plate 552, and the movable unit 55 is displaced by the received Lorentz forces.

Figure 13:
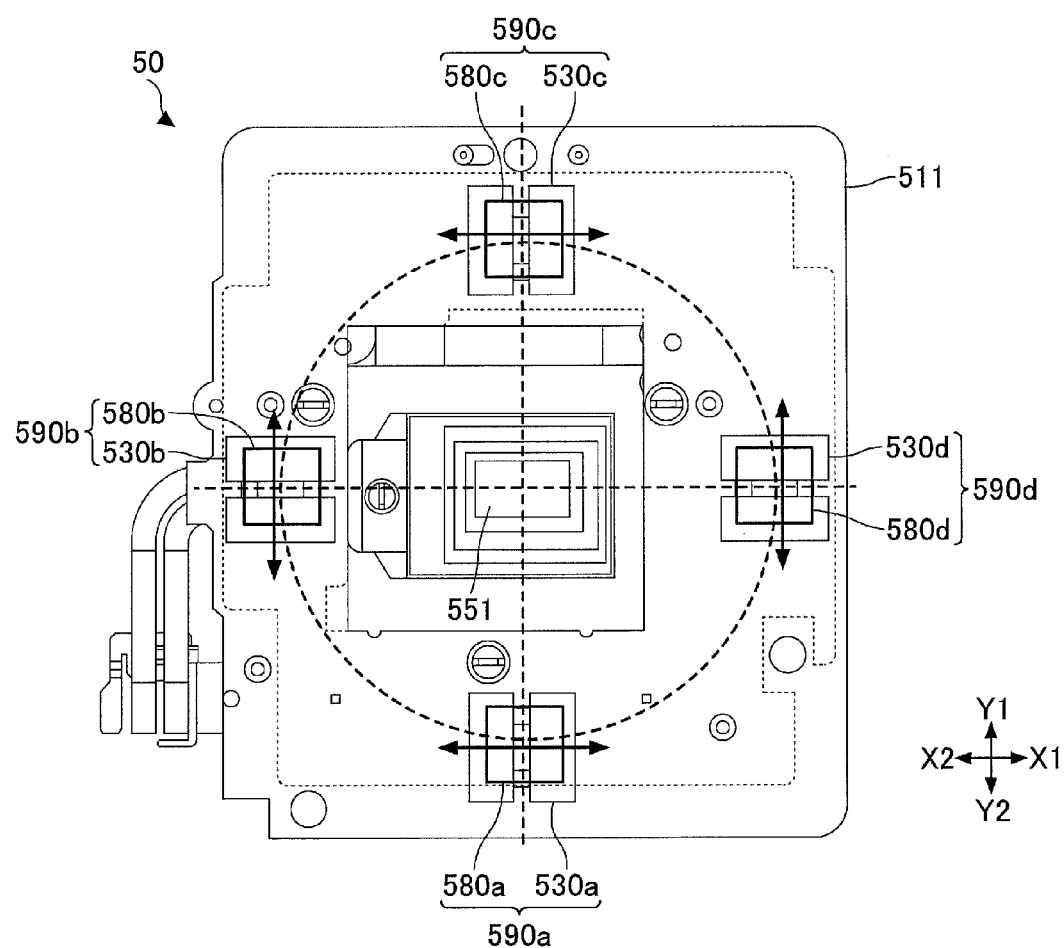
FIG. 13 is a top view of the image displaying unit according to an embodiment of the present invention.

FIG. 13 is a top view of the image displaying unit 50 according to an embodiment, and is also a perspective view illustrating the arrangements of the magnets 530 and the coils 580.

As illustrated in FIG. 13, in the image displaying unit 50 according to the present embodiment, the magnets 530a through 530d provided in the top plate 511 and the coils 580a through 580d provided in the movable plate 552 are respectively disposed so as to face each other.

The magnet 530a and the coil 580a constitute a first actuator 590a that generates Lorentz forces operating in a parallel direction to the X1-X2 directions as driving forces. The magnet 530b and the coil 580b constitute a second actuator 590b that generates Lorentz forces operating in a parallel direction to the Y1-Y2 directions as driving forces. The magnet 530c and the coil 580c constitute a third actuator 590c that generates Lorentz forces operating in a parallel direction to the X1-X2 directions as driving forces. The magnet 530d and the coil 580d constitute a fourth actuator 590d that generates Lorentz forces operating in a parallel direction to the Y1-Y2 directions as driving forces.

In a pair of actuators including the first actuator 590a and the third actuator 590c, the actuators are disposed so as to face each other in the Y1-Y2 directions across the DMD 551, and generate driving forces operating in a direction parallel to the X1-X2 directions on the movable unit 55. In a pair of actuators including the second actuator 590b and the fourth actuator 590d, the actuators are disposed so as to face each other in the X1-X2 directions across the DMD 551, and generate driving forces operating in a direction parallel to the Y1-Y2 directions on the movable unit 55.

The first actuator 590a, the second actuator 590b, the third actuator 590c, and the fourth actuator 590d are disposed at equally spaced intervals along the same circle, centered around the DMD 551, as illustrated in FIG. 13. Furthermore, the first actuator 590a, the second actuator 590b, the third actuator 590c, and the fourth actuator 590d are disposed such that a line connecting the first actuator 590a and the third actuator 590c and a line connecting the second actuator 590b and the fourth actuator 590d are orthogonal to each other. In the present embodiment, the first actuator 590a, the second actuator 590b, the third actuator 590c, and the fourth actuator 590d are disposed so as to at least partially overlap the same circle, centered around the intersection point of the diagonal lines of the DMD 551 having a rectangular shape.

The above configuration enables the first actuator 590a, the second actuator 590b, the third actuator 590c, and the fourth actuator 590d to generate Lorentz forces and move the movable unit 55 in any direction. Furthermore, the movable unit 55 can be rotated, centered around the DMD 551.

Figure 14:
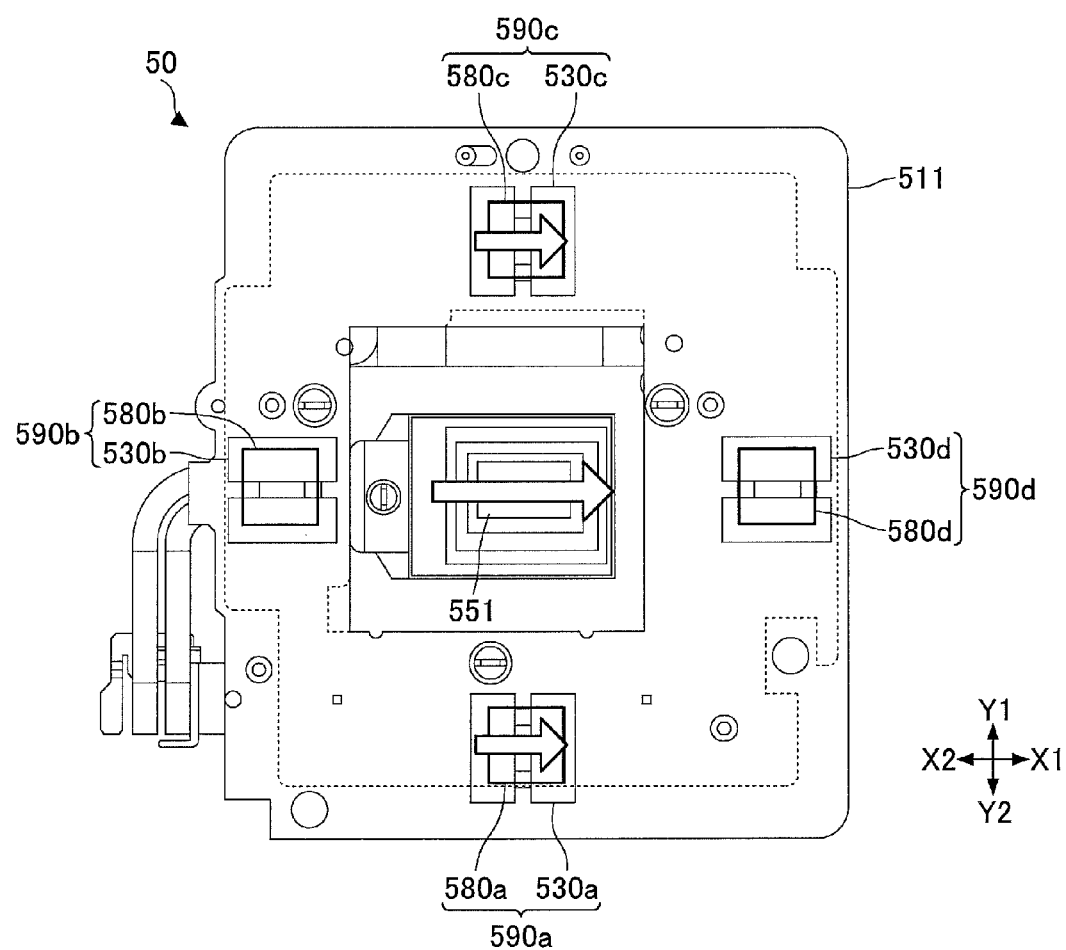
FIG. 14 is a diagram illustrating operations of the image displaying unit according to an embodiment of the present invention.

When the movable unit 55 is moved in the X1 direction, as illustrated in FIG. 14, a current is sent to the coil 580a and the coil 580c such that Lorentz forces are generated in the X1 direction in the first actuator 590a and the third actuator 590c. The movable unit 55 receives the Lorentz forces that are generated in the first actuator 590a and the third actuator 590c, and the movable unit 55 is displaced in the X1 direction by the received Lorentz forces.

When the movable unit 55 is to be moved in the X2 direction, a current is sent to the coil 580a and the coil 580c in a direction opposite to the direction in the case of moving the movable unit 55 in the X1 direction, to generate Lorentz forces in the X2 direction and move the movable unit 55 in the X2 direction.

Figure 15:
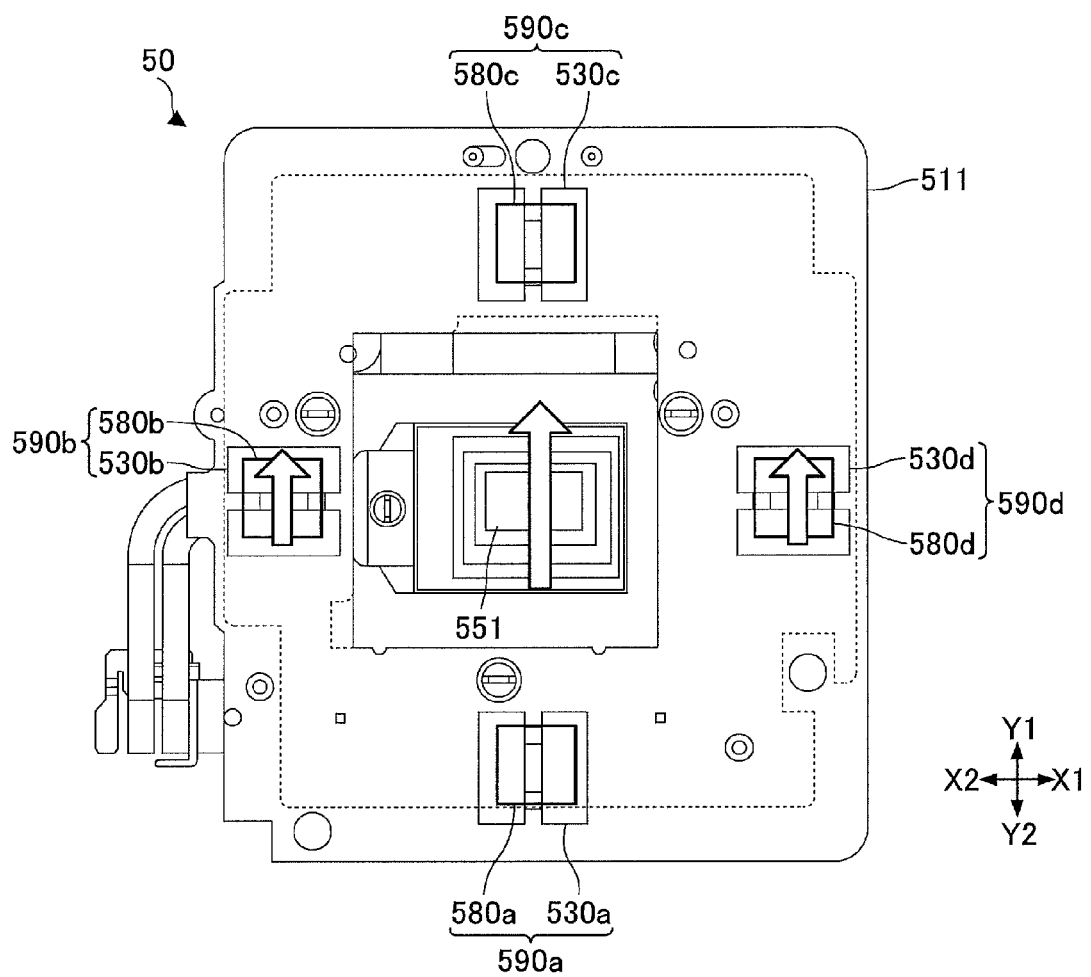
FIG. 15 is a diagram illustrating operations of the image displaying unit according to an embodiment of the present invention.

When the movable unit 55 is to be moved in the Y1 direction, as illustrated in FIG. 15, a current is sent to the coil

580b and the coil 580d to generate Lorentz forces in the Y1 direction in the second actuator 590b and the fourth actuator 590d. The movable unit 55 receives the Lorentz forces that are generated in the second actuator 590b and the fourth actuator 590d, and the movable unit 55 is displaced in the Y1 direction by the received Lorentz forces.

When the movable unit 55 is to be moved in the Y2 direction, a current is sent to the coil 580b and the coil 580d in a direction opposite to the direction in the case of moving the movable unit 55 in the Y1 direction, to generate Lorentz forces in the Y2 direction and move the movable unit 55 in the Y2 direction.

Figure 16:
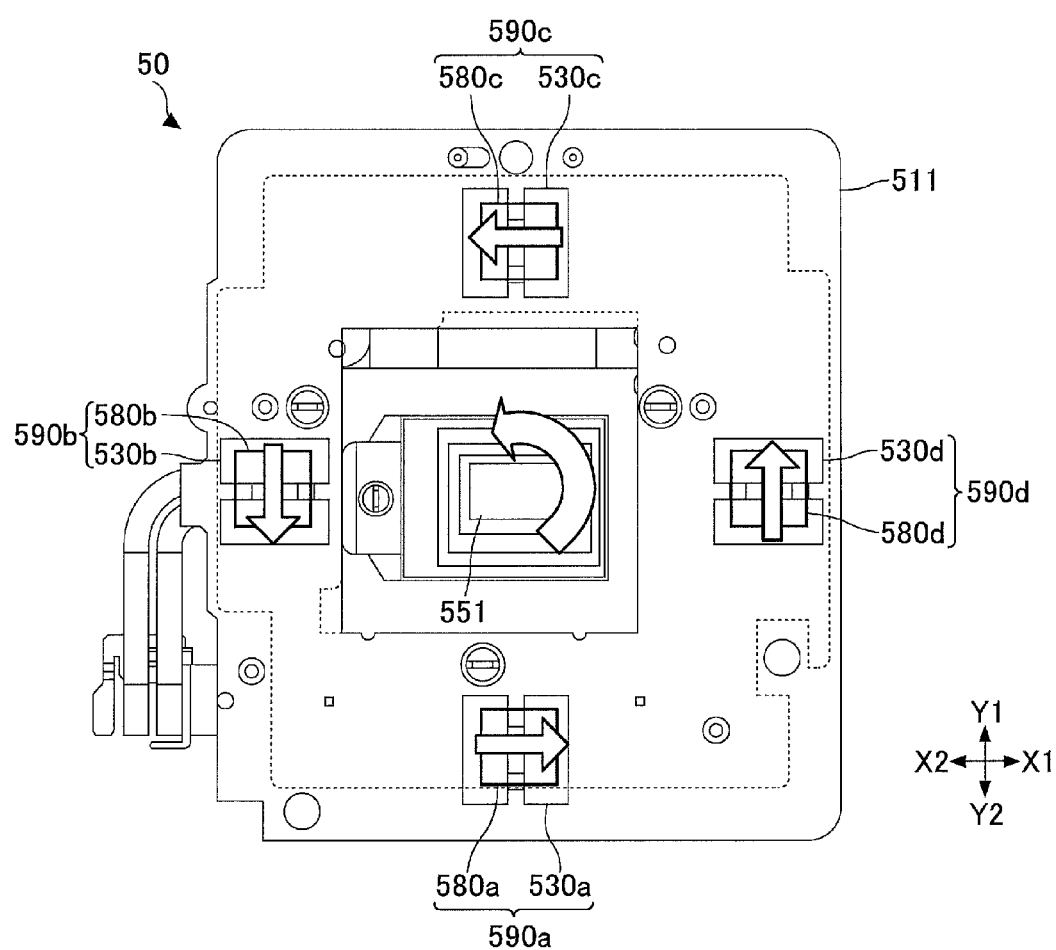
FIG. 16 is a diagram illustrating operations of the image displaying unit according to an embodiment of the present invention.

When the movable unit 55 is to be rotated, as illustrated in FIG. 16, Lorentz forces in the X1 direction are generated in the first actuator 590a and Lorentz forces in the Y2 direction are generated in the second actuator 590b. Furthermore, Lorentz forces in the X2 direction are generated in the third actuator 590c and Lorentz forces in the Y1 direction are generated in the fourth actuator 590d.

As described above, a current is sent to the coils 580a through 580d such that Lorentz forces of different directions are generated in the first actuator 590a, the second actuator 590b, the third actuator 590c, and the fourth actuator 590d. Accordingly, the movable unit 55 receives the Lorentz forces and rotates in a counterclockwise direction as viewed in FIG. 16.

Furthermore, Lorentz forces may be generated in the first actuator 590a, the second actuator 590b, the third actuator 590c, and the fourth actuator 590d, in directions opposite to the directions in the example of FIG. 16, to rotate the movable unit 55 in a clockwise direction as viewed in FIG. 16.

As described above, the first actuator 590a, the second actuator 590b, the third actuator 590c, and the fourth actuator 590d are disposed at equally spaced intervals along a circle, centered around the DMD 551, and Lorentz forces of different directions are generated in the first actuator 590a, the second actuator 590b, the third actuator 590c, and the fourth actuator 590d. Accordingly, the movable unit 55 can be rotated, centered around the movable unit 55.

In the projector 1 according to an embodiment, the DMD 551 is rotated together with the movable unit 55, and therefore the movable unit 55 can be rotated without reducing the projection image. For example, in a projector in which the image generation unit such as the DMD 551, etc., is fixed, the projection image has to be reduced in order to rotate the movable unit 55 while maintaining the aspect ratio of the projection image. In contrast, in the projector 1 according to an embodiment, the DMD 551 is also rotated as described above, and therefore the movable unit 55 can be rotated without reducing the projection image.

The movement control unit 12 controls the first actuator 590a, the second actuator 590b, the third actuator 590c, and the fourth actuator 590d to displace the DMD 551, such that the projection image is moved or rotated, for example, according to user operations at the operation unit 7. The user of the projector 1 can operate the operation unit 7 to adjust the position and the tilt, etc., of the projection image and optimize the projection position on the screen S.

Furthermore, for example, the movement control unit 12 performs reciprocation movement of the DMD 551 with respect to the frame rate between two positions lying apart by the distance less than the array interval of the micromirrors of the DMD 551 in the X1-X2 directions and the Y1-Y2 directions at the predetermined cycle. At this time, the image control unit 11 controls the DMD 551 to generate a projection image shifted according to each of the positions, and it is possible to make the resolution of the projection image to be twice the resolution of the DMD 551. Moreover, the resolution of the projection image can be made to be more than twice the resolution of the DMD 551 by increasing the movement range of the DMD 551.

The movement control unit 12 moves the DMD 551 and the movable unit 55 at the predetermined cycle and the image control unit 11 controls the DMD 551 to generate the projection image according to the position. Hence, it is possible to obtain the resolution of the projection image which is higher than the resolution of the DMD 551.

Note that in the above embodiment, the magnets 530 included in the first actuator 590a, the second actuator 590b, the third actuator 590c, and the fourth actuator 590d are provided in the fixed unit 51, and the coils 580 are provided in the movable unit 55; however, the embodiment is not so limited. For example, the magnets 530 may be provided in the movable unit 55 and the coils 580 may be provided in the fixed unit 51.

As described above, the projector 1 according to the present embodiment is capable of moving a projection image in a parallel direction and rotating a projection image, without requiring a large-sized device configuration. Therefore, the user can easily adjust the position and the tilt, etc., of the projection image.

The image projection apparatus is not limited to the specific embodiments described in the detailed description, and variations and modifications may be made without departing from the spirit and scope of the present invention.

What is claimed is:
1. An image projection apparatus comprising:
 a digital micromirror device configured to use light emitted from a light source to generate an image;
 a movable member that includes a movable plate and a second plate fixed to the movable plate; wherein the digital micromirror device is mounted on a surface of the second plate;
 a fixed member that includes a top plate and a base plate; wherein the movable plate of the movable member is provided between the top plate and the base plate of the fixed member;
 a first support ball held in a first support hole formed in the top plate and a second support ball held in a second support hole formed in the base plate; wherein the first support ball and the second support ball are both held in contact with the movable plate provided between the top plate and the base plate so as to movably support the movable plate; wherein the movable plate, the second plate fixed to the movable plate, and the digital micromirror device mounted to the surface of the second plate are movable in a direction parallel to the top plate and the base plate of the fixed member;
 a mover configured to move the movable member, the mover including:
  a first pair of actuators disposed facing each other in a first direction across the digital micromirror device, the first pair of actuators being configured to cause a driving force to operate on the movable member in a direction parallel to a second direction orthogonal to the first direction; and
  a second pair of actuators disposed facing each other in the second direction across the digital micromirror device, the second pair of actuators being configured to cause a driving force to operate on the movable member in a direction parallel to the first direction.

2. An image projection apparatus comprising:
an image generator configured to use light emitted from a light source to generate an image;
a movable member that includes a movable plate containing a central hole; wherein the image generator is mounted on the movable member at a position corresponding to the central hole;
a fixed member that includes a top plate and a base plate; wherein the movable plate of the movable member is provided between the top plate and the base plate of the fixed member; and wherein the movable plate and the image generator mounted on the movable member are movably supported by the fixed member so as to be movable relative to the fixed member; and
a mover configured to move the movable member, the mover including:
   a first pair of actuators disposed facing each other in a first direction across the an image generator, the first pair of actuators being configured to cause a driving force to operate on the movable member in a direction parallel to a second direction orthogonal to the first direction; and
   a second pair of actuators disposed facing each other in the second direction across the an image generator, the second pair of actuators being configured to cause a driving force to operate on the movable member in a direction parallel to the first direction.

3. An image projection apparatus comprising:
a fixed member that includes a top plate and a base plate;
a movable member that includes a movable plate and a joint plate; wherein the movable plate is provided between the top plate and the base plate, and the joint plate is movable by the movable plate;
a digital micromirror device that is mounted to the joint plate;
support balls provided between the top plate and the base plate; the support balls movably supporting the movable plate such that the movable plate is movable between the top plate and the bottom plate;
a mover configured to move the movable member, the mover including a first pair of actuators facing each other in a first direction across the digital micromirror device, and a second pair of actuators facing each other in a second direction across the digital micromirror device.

4. The image projection apparatus according to claim 3, wherein the second direction is orthogonal to the first direction;
wherein the first pair of actuators is configured to cause a driving force to operate on the movable member in a direction parallel to the second direction; and
wherein the second pair of actuators is configured to cause a driving force to operate on the movable member in a direction parallel to the first direction.

5. The image projection apparatus according to claim 4, wherein the first pair of actuators includes one of a first magnet and a first coil, which is provided on the top plate of the fixed member, and includes the other of the first magnet and the first coil, which is provided on the movable plate of the movable member; and
wherein the second pair of actuators includes one of a second magnet and a second coil, which is provided on the top plate of the fixed member, and includes the other of the second magnet and the second coil, which is provided on the movable plate of the movable member.

6. The image projection apparatus according to claim 4, wherein the actuators included in the first pair of actuators and the second pair of actuators are disposed along a same circle, centered around the image generator.

7. The image projection apparatus according to claim 4, wherein each of the actuators includes:
a coil configured to receive a current having a magnitude corresponding to a movement amount of the movable member; and
a magnet disposed facing the coil.

8. The image projection apparatus according to claim 7, wherein
the coil is disposed on one side of the movable member and the fixed member, and
the magnet is disposed on another side of the movable member and the fixed member.

9. The image projection apparatus according to claim 3, wherein the movable plate contains a central hole; and
wherein the digital micromirror device is mounted on the movable member at a position corresponding to the central hole.

10. The image projection apparatus according to claim 3, further comprising a first support ball held in a first support hole formed in the top plate and a second support ball held in a second support hole formed in the base plate; wherein the first support ball and the second support ball are both held in contact with the movable plate provided between the top plate and the base plate so as to movably support the movable plate.

11. The image projection apparatus according to claim 3, wherein the digital micromirror device includes an array of a plurality of micromirrors configured to modulate light emitted from a light source based on input image data.

* * * * *